(12) United States Patent
Johnson et al.

(10) Patent No.: US 10,652,139 B1
(45) Date of Patent: May 12, 2020

(54) AUTOMATIC COMMUNICATION NETWORK FAILURE DETECTION AND REMEDIATION

(71) Applicant: Microsoft Technology Licensing, LLC, Redmond, WA (US)

(72) Inventors: Ronald Johnson, Redmond, WA (US); Rahul Ramachandra Varrier, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/244,684

(22) Filed: Jan. 10, 2019

(51) Int. Cl.
*H04L 12/707* (2013.01)
*H04L 29/06* (2006.01)
*H04L 29/08* (2006.01)

(52) U.S. Cl.
CPC .......... *H04L 45/22* (2013.01); *H04L 65/1086* (2013.01); *H04L 65/403* (2013.01); *H04L 65/60* (2013.01); *H04L 67/142* (2013.01)

(58) Field of Classification Search
None
See application file for complete search history.

(56) References Cited

U.S. PATENT DOCUMENTS

| | | | | |
|---|---|---|---|---|
| 6,498,791 | B2* | 12/2002 | Pickett | H04L 12/2856 370/353 |
| 9,473,363 | B2* | 10/2016 | Lyle | H04L 67/1029 |
| 2010/0260101 | A1* | 10/2010 | Tsirtsis | H04W 76/14 370/328 |
| 2014/0293779 | A1* | 10/2014 | Kako | H04W 40/36 370/230 |
| 2016/0285926 | A1* | 9/2016 | Sall | H04M 3/563 |
| 2019/0158546 | A1* | 5/2019 | Page | H04L 65/403 |

* cited by examiner

*Primary Examiner* — Hong S Cho
(74) *Attorney, Agent, or Firm* — Schwegman Lundberg & Woessner, P.A.

(57) ABSTRACT

Disclosed in some examples are methods, systems, and machine-readable mediums which provide for a communication monitoring system configured to automatically monitor and process communication records according to one or more error detection profiles to detect one or more error conditions described in the error detection profiles. The system may then automatically determine a network segment that is experiencing the error condition and acts to correct or avoid the error condition. For example, the system may instruct a conference communication service to re-route a caller over a different network segment, instruct a user's device to use a different network segment, send a message to a reporting computing device of the offending network segment, or the like.

20 Claims, 10 Drawing Sheets

US 10,652,139 B1

AUTOMATIC COMMUNICATION NETWORK FAILURE DETECTION AND REMEDIATION

BACKGROUND

The Public Switched Telephone Network (PSTN) was originally designed as a circuit-switched network designed to provide voice services for users. Over time, the PSTN has evolved to provide other services such as data transmission. Communications across the PSTN may travel over one or more network segments over one or more carriers using telephone lines, fiber optic cables, transmission links, and other segments connected by switching centers. One or more of these network segments may have one or more problems, issues, misconfigurations, or policies that cause these communications to fail or be of low quality.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
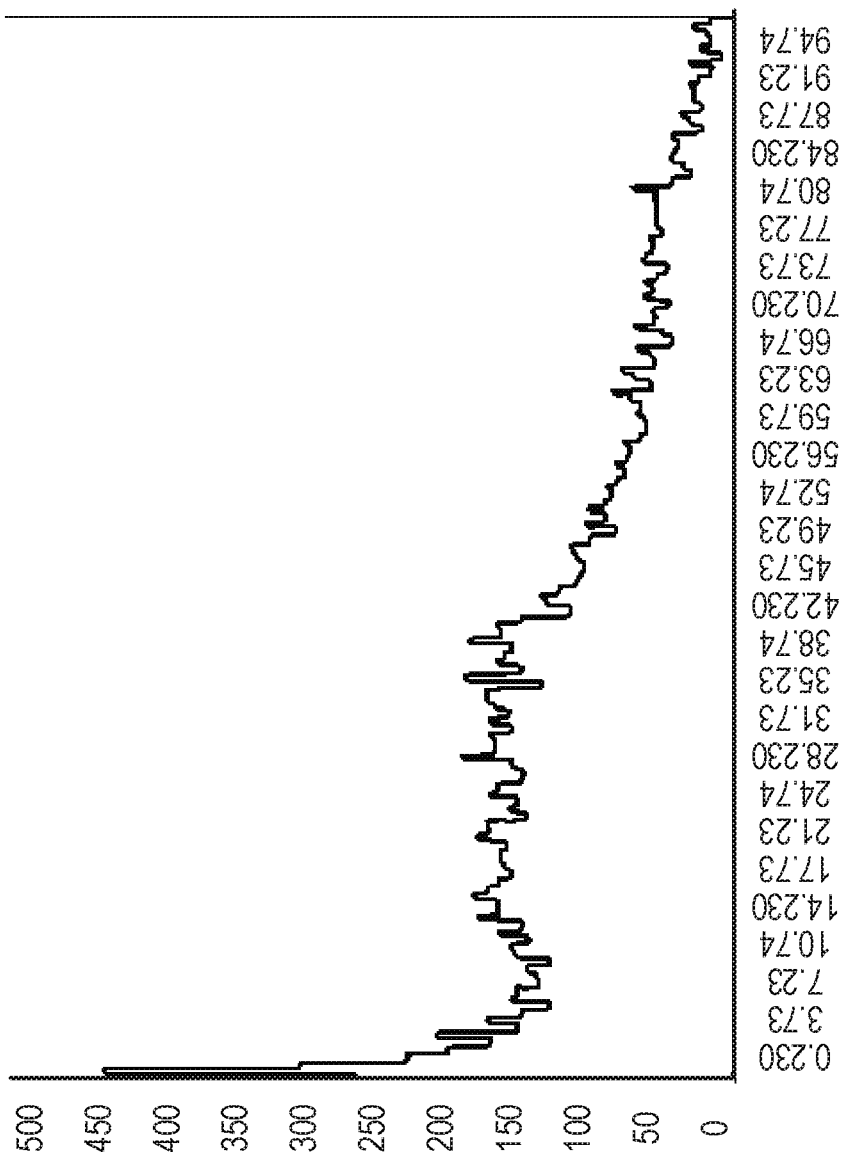
FIG. 1 illustrates an example of an expected call duration distribution according to some examples of the present disclosure.

The cause of certain PSTN failures and misconfigurations may be difficult to diagnose and detect. One reason these failures are difficult to diagnose and detect is in scenarios where a problem only affects a limited amount, or a specific type, of traffic. Typically, carriers only troubleshoot problems that affect a large number of customers. Some usages of the PSTN network, due to their particular characteristics, are more sensitive to certain network problems than other usages. For example, a PSTN network carrier may have a misconfigured communication duration timer that ends communication sessions (such as phone calls) that have been connected for over a threshold amount of time. This timer may not affect most person-to-person phone calls, because most of these communications do not last long enough to trigger the timer. However, this timer may affect one or more users of a conference communication session (such as a conference call) that may routinely last longer. Debugging problems such as timer disconnects may be difficult as it may not be apparent from the communication records (such as call records) alone that a problem exists. In the example in which a misconfigured timer is hanging up on communications, the communication records themselves may not show that a timer caused the network to terminate the communication. Because only a specific usage is affected, and because the communication records do not necessarily show anything abnormal, such network misconfigurations may occur for quite some time before they are detected, diagnosed, and fixed. While such problems may account for a small percentage of total problems in the network or affect a small proportion of users, for those that are affected by the problem, the problem is often very persistent.

Disclosed in some examples are methods, systems, and machine-readable mediums which provide for a communication monitoring system that automatically monitor and process communication records according to one or more error detection profiles to detect one or more error conditions described in the error detection profiles. The system may then automatically determine a network segment that is experiencing the error condition and act to correct or avoid the error condition. For example, the system may instruct a conference communication service to re-route a caller over a different network segment, instruct a user's device to use a different network segment, send a message to a reporting computing device of the offending network segment, or the like.

Error detection profiles may be specific to one or more error conditions that the communication monitoring system is configured to detect. The error detection profile may contain one or more communication record transformation instructions, and/or one or more instructions for determining one or more error conditions from the transformed communication records. Communication record transformation instructions may convert raw communication records (e.g., call records) into one or more processed records or other intermediate data. For example, the instructions may cause the communication monitoring system to produce communication duration counts for respective communication duration ranges that describe the number of communications that had communication durations that fell within each respective range. The instructions for determining one or more conditions from the transformed communication records are instructions, which when executed, cause a determination of whether or not an error condition is present based upon the raw communication data and/or processed records and intermediate data. Examples include comparing the processed records, intermediate data, or raw communication data to thresholds or other comparators. In the example of communication duration counts, the instructions may be instructions to identify or flag an error if one or more of the communication durations exceed one or more thresholds.

The disclosed embodiments thus solve a technical problem of detecting and resolving difficult to detect errors in a PSTN network that cause undesired network disconnects and other quality issues. This problem is solved by the technical solution of a communication monitoring system that periodically and automatically analyzes recent communication records for the occurrence of one or more error conditions specified in one or more error detection profiles. Upon detecting an error condition, the communication monitoring system determines the network segment causing the problem and acts to correct the issue to minimize service interruptions. For example, the communication monitoring system may re-route traffic around the network segment that is affected.

The communication monitoring system improves the functioning of the PSTN and other networks and, in some examples, improves the functioning of a communication conference server for a number of reasons. First, the system reduces network traffic and other resources associated with duplicated communication setup signaling from users who redial after they are disconnected due to these errors. For conference communications this also reduces resource consumption on the conference communication server associated with this call signaling. Second, fixing these errors reduces network storage requirements for communication data records. For example, if users redial after they are disconnected, a new communication record is created and stored. By preserving the original communication, a second communication record is not created. Finally, this improves the user experience for the user as they are not disconnected or otherwise denied access to the PSTN.

As a first example error condition that is detectable and remediated by the communication monitoring system, consider a scenario where Public Switch Telephone Networks (PSTN) carriers utilize absolute session timers that hang up a communication when the communication has reached a certain duration (typically 30 minutes). In addition, carriers may have real-time-protocol (RTP) inactivity timers that terminate the communication within a particular time period because a communication may be put on hold and RTP packets are no longer being sent. As previously noted, this may be a problem that affects conference communications disproportionately. This is because conference communications (e.g., conference calls) routinely last 30 minutes or more and can result in users being put on hold—such as when they are waiting for the meeting to start. These issues may be fixed through configuration changes at the carrier in the long-term but may be fixed in the short term by routing conference communication traffic over different PSTN networks.

An error detection profile to detect timer errors like those described above may include record transformation instructions which calculate, from the communication records, a count of the number of communications that have communication durations that correspond to one or more duration ranges. For example, a set of one or more communication duration ranges may be defined, and a counter may be associated with each communication duration range. Each communication duration range may have a beginning duration and an ending duration. As an example, a communication duration range may be a range between 2.5 minutes to 3.0 minutes. The counter for a particular communication duration range may be incremented for each communication record found that describes a communication having a duration that is more than the beginning and less than the ending duration of the particular communication duration range. The count data may be normalized based upon total call volumes. The communication records used may be from a time slice of all communication records—for example, the last hours' worth of communication records, the last days' worth, and the like.

The instructions for determining one or more error conditions comprise instructions for determining an unusually high number of communications within one or more communication duration ranges. This may be determined when a number of communications for a particular duration exceeds an expected number of communications by a threshold amount. Previous communication duration data of properly configured networks can be used to estimate an expected number of communications that have durations within the various communication duration ranges. In some examples, the expected number of communications may be normalized such that variances in total traffic may be accounted for. If the normalized number of communications with one of the monitored communication duration ranges exceeds the normalized expected number of communications by a threshold number—the system may determine that the network is misconfigured.

When the PSTN is functioning as expected, a plot with communication durations on the x-axis and number of communications on the y-axis typically has an expected distribution. An example of an expected distribution is shown in FIG. 1. FIG. 1 shows a spike at the 0.230-3.73 duration, which suggests that many phone communications are very short. Past that, the number of phone communications reduces gradually as the duration increases. Past data may be utilized to fit a distribution function to model the expected communication volumes. In other examples, a normalized average value for each particular duration range may be determined. The functions and/or normalized average values as well as thresholds (e.g., the count of the number of communications that are allowed to exceed the functionally predicted number or the normalized average values) may be stored as part of an error detection profile.

Communication records may be analyzed in near-real time to determine spikes that are abnormal from the learned model. For example, a slice corresponding to the last ten minutes of communication durations may be analyzed to determine if there are any variances in a number of communications at a particular duration. Any variances over a threshold may indicate an error condition.

In some examples, the system may only monitor one or more particular duration ranges around which problems are known to occur. Thus, for example, the system may detect RTP timeouts by looking for unusually high numbers of communications with durations around the expected timeout values (e.g., three minutes). The system may also look for unusually high spikes in communication durations around the expected total communication duration timeout (e.g., around the thirty minute duration). Thus, the error profile may compare the recently observed average normalized communication volume for communications lasting three minutes and thirty minutes to a baseline average normalized communication volume for communications that last three minutes and thirty minutes. If the difference is not within a threshold difference, then the system determines that there is an error.

In other examples, all duration ranges may be scrutinized. For example, historical data is used to fit a model function across the entire range of communication durations and the model may be compared to the duration counts of a current slice of communication data to determine variations that are beyond a particular threshold variation. In these examples, the threshold variation may be global—such as by communication volume for each duration that is compared against the model and if the difference is greater than the global threshold, the system determines that there is an error. In other examples, each duration may have a different threshold—that is, communication volume for each duration is compared against the model and if the difference is greater than the threshold for that duration, then the system determines that there is an error. The latter approach may be useful if some durations show more variability than others in communication volume.

Figure 2:
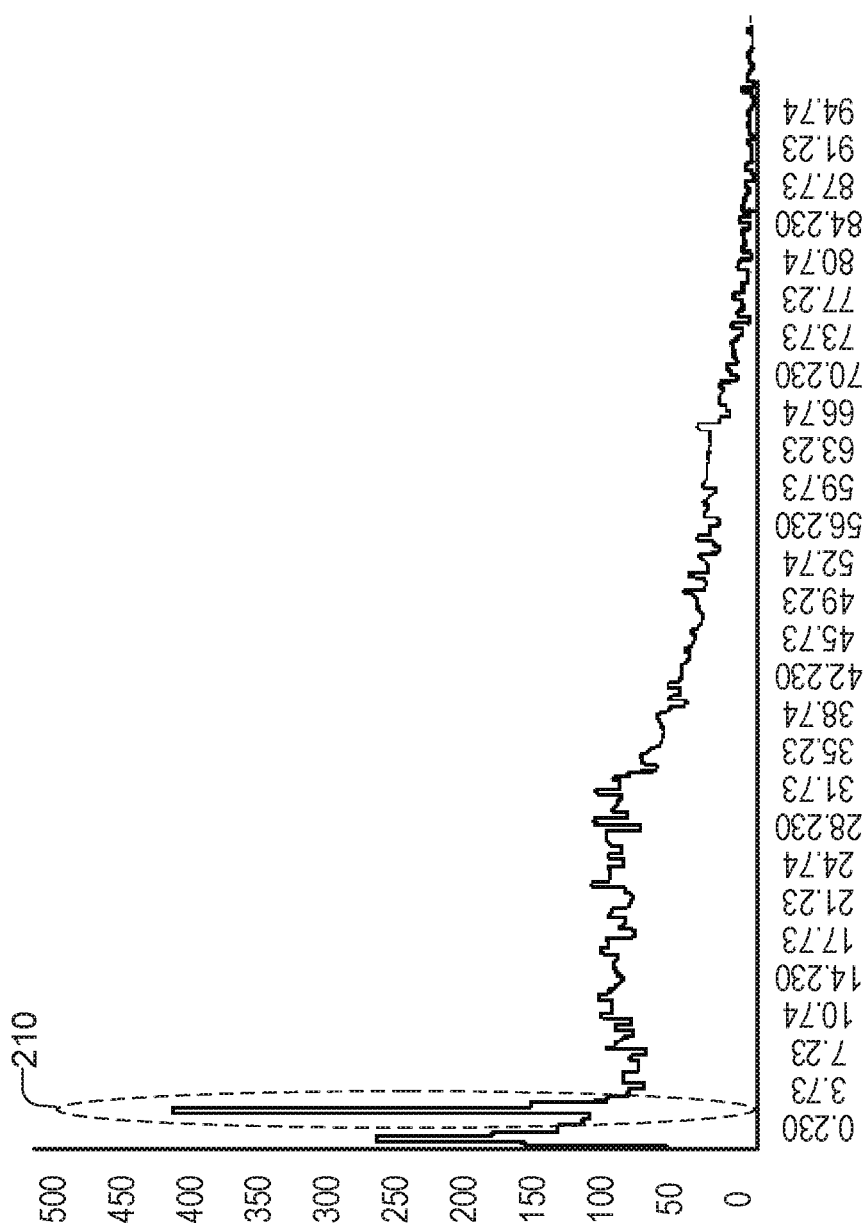
FIG. 2 illustrates an example of a communication distribution indicating an abnormal spike in communication volume of communications according to some examples of the present disclosure.

FIG. 2 shows an example of a communication distribution indicating an abnormal spike in communication volume of communications that have a duration of around three minutes. The abnormal spike is shown with circle 210. This suggests that the network has an RTP timer configured that is terminating certain communications at this time. Similarly, if a spike occurred around the thirty-minute mark, the communication records would suggest that the network had a communication duration timer at thirty minutes. As noted, instead of, looking at specific communication durations (e.g., communication durations around which known problems are typically found) the system may look at all communication durations.

Another example error detection profile may detect a failure of the PSTN network to pass dual-tone multi-frequency (DTMF) tones. Users dialing into a conference communications service dial a known number and then enter, via their touchtone phones, a series of numbers and/or digits that specify a conference communications bridge. The conference communication server than joins the communications of the users in the bridge. These tones are passed to the conference communications server with DTMF signaling. If the PSTN server does not pass the DTMF tones, the user may not be able to join the conference bridge.

An error detection profile to detect this error condition may include communication record transformation instructions that causes the system to count the number of communications that did not transition to a communication bridge. A certain percentage of communications typically fail before the transition and this may be observed over a period of time. In some examples, around 11% of communications do not transition. Large spikes in communications that do not make this transition may be indicative of problems. If an observed percentage of communications that do not transition exceeds an expected value (e.g., 11%) by a threshold, then an error may be indicated.

Figure 3:
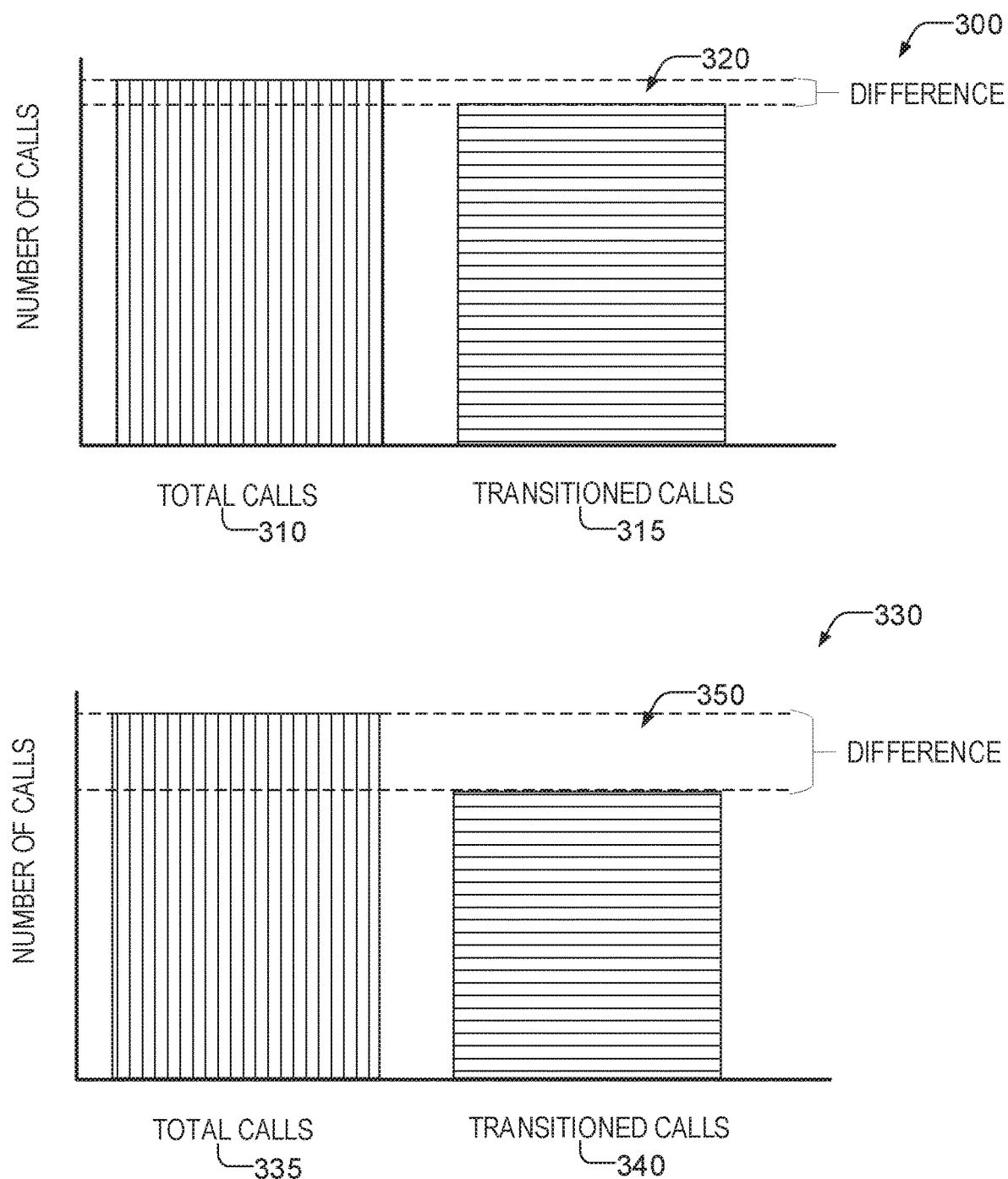
FIG. 3 illustrates how DTMF tone pass-through failures may be detected according to some examples of the present disclosure.

FIG. 3 illustrates how DTMF tone pass through failures may be detected according to some examples of the present disclosure. Graph 300 shows a bar graph of total communications 310 compared with communications that transitioned to a bridge 315. The difference 320 may be less than a threshold (e.g., 11%). The graph 300 shows a normal situation that is not indicative of a problem. In contrast, graph 330 shows a total number of communications handled by the communication conferencing server 335 and the number of transitioned communications 340. The difference 350 is much greater and may indicate a problem if the difference 350 is over a threshold.

As already noted, other issues may exist in PSTN networks that may not be specific to conference communications. For example, as noted, the carrier may return an indication that a phone number is invalid. Some of these failures are incorrect. These may be detected by analyzing the communication records to determine that, within a particular period of time, a communication to the same number had previously succeeded. In order to fix this, the carrier may be contacted. An error detection profile to detect this error may have one or more communication record transformation instructions that determine a first list of phone numbers having at least one successful communication establishment and a second list of phone numbers that had failed communication establishments due to a wrong number indication. The instructions for determining this error condition may instruct the communication monitoring system to determine if any numbers on the second list are also in the first list. If any numbers are found, then this error may be indicated for those numbers.

Once any problems are detected, an offending network segment may be identified by analyzing the various communication records associated with the problem. For example, communication records having a duration that corresponds to the duration that exceeded the normalized count by the particular duration may be analyzed. In some examples, all network segments of communications with these particular durations may be labelled as "bad." In other examples, the network segment responsible for the most number of communications within this particular duration may be labelled as "bad." Similarly, for DTMF errors, all network segments responsible for handling any part of a communication that did not transition to a bridge may be labelled as "bad," or only those responsible for the most amount of communications that do not transition to a bridge.

In still other examples, communication records for each particular network segment may be analyzed individually using the error detection profiles. Each error detection profile may be specific to each particular network segment. For example, the expected number of calls with a given duration may be per-network segment. Thus, if an error condition is detected, it is detected on a per-segment granularity.

In one example, due to the nature of the PSTN network, if both inbound and outbound communications terminating with a same network segment show signs of quality issues, then the problem may be identified as likely within that network segment. For example, many conference communication customers have their own PSTN network segments that may be misconfigured. These customers may blame the conference communication server for their issues. Due to the nature of the PSTN network, inbound communications and outbound communications are often routed through different circuits. If both inbound and outbound communications show signs of quality issues the common network element is the customer's network. As a result, it is likely that the customer's network is the problem. In that case, the conference communication server may message the administrator of the PSTN network to notify them that their network is misconfigured.

Once a network segment is identified, various methods may exist to reduce the impact of the problem automatically and/or to notify an administrator at a PSTN to fix the issue. For example, conference communications may be redirected over a different network segment. To accomplish this, the conference communication server may switch to using a different network gateway device (e.g., switch to using a different PSTN network provider). In other examples, devices such as cellphones may have alternative networks that may be utilized. For example, a device accessing the conference bridge over the cell network's voice network may be redirected to access the conference bridge over an IP network. This may even be performed automatically. For example, a conference server may send a message to an application (e.g., a SKYPE FOR BUSINESS® application) executing on the user's device to disconnect via the voice network and reconnect over the IP network.

Figure 4:
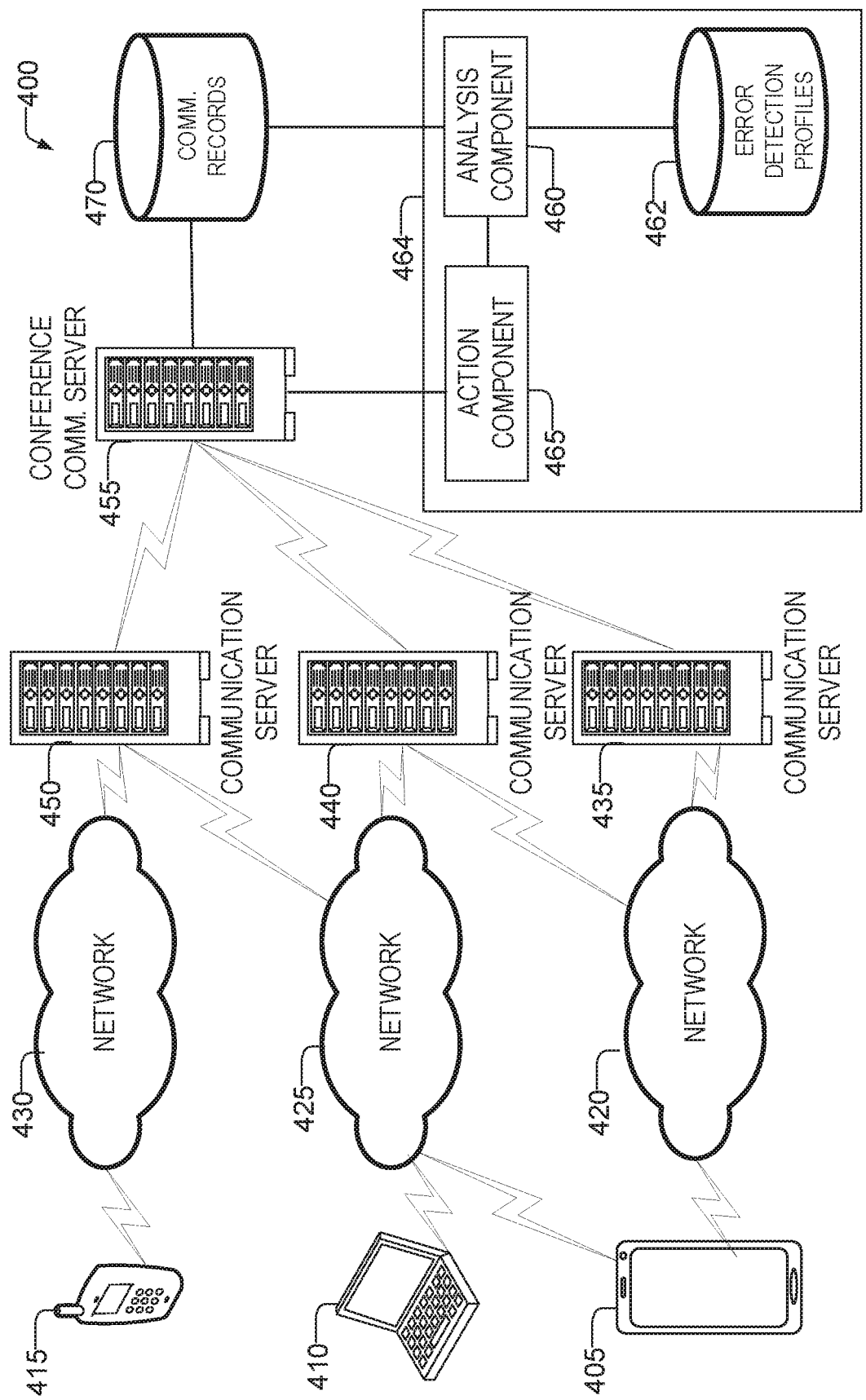
FIG. 4 illustrates a logical diagram of a conferencing communication environment according to some examples of the present disclosure.

As noted previously, the error detection capabilities of the presently disclosed system may be particularly suitable for use in a conference communication environment as the issues detected may particularly affect this environment. FIG. 4 illustrates a logical diagram of a conferencing communication environment 400 according to some examples of the present disclosure. User computing devices 405, 410, and 415 may access one or more networks 420, 425, and 430. Networks 420, 425, and 430 may be Internet Protocol (IP) networks, PSTN networks, or the like. When user computing devices 405, 410, and 415 access a conference communication, voice and/or data may be routed through the networks to one or more communication servers 435, 440, and 450. Communication servers 435, 440, and 450 may connect-directly or through one or more additional networks-to the conference communication server 455. For example, if a computing device, such as a telephone, connects to the conference server, the traffic may be routed over a PSTN and terminate at one of the communication servers 435, 440, and 450 which may connect the communication to the conference communication server 455.

Communication servers 435, 440, and 450 may be network gateways, switches, routers, exchanges, tandem switches, or the like. For example, communication servers 435, 440, 450 may be class 1, class 2, class 3, class 4, or class 5 offices in a PSTN network. In some examples, communications may be routed to the conference communication server 455 from networks 420, 425, and 430 via a selection of one or more communication servers 435, 440, and 450. For example, communications of user computing device 405 may travel across network 420, through either communications server 435 or communication server 440 to the conference communication server 455. Additionally, in some examples, the user computing devices may have access to multiple networks. For example, user computing device 405 may send communications across network 425 or network 420. The choice of which communication server that handles the communications may be made by the conference communication server 455 or may be a choice of routing decisions in the networks. These routing decisions may be affected by input from the conference communications server 455.

Once the communication is connected to the conference communications server 455, the user may enter information specifying a conference bridge. The conference communication server 455 then joins the users utilizing the same conference bridge into a communications conference. Audio and/or video and data may be shared amongst users in the communications conference. Once a communication from a user device connects with a conference communication server 455, the conference server may store one or more communication records in communication records database 470. Communication records may describe a communication session between two or more users and/or between a user and the conference communication server 455. The communication records may include a communication server that the communication is received from, the source phone number, whether the communication is connected to a bridge (and what bridge), the total communication duration, and the like. In some examples, communication records database 470 may have access to, and store communication records from, one or more of networks 420, 425, and 430.

Communication monitoring system 464 may include an analysis component 460, error detection profiles storage 462, and an action component 465. These components may be executed by a same machine (e.g., machine 1100) or one or more different machines. The components may be executed on the conference communications server 455. The logical structure of the communication monitoring system 464 is exemplary and one of ordinary skill in the art with the benefit of the present disclosure will appreciate that other structures are possible.

Analysis component 460 may obtain a time slice of communication records. Each time slice corresponds to communications within a particular time window. The time slice may be a recent time period (e.g., communications within the last half-hour), or may be a more distant time period (yesterday's communications). The slice may be a large slice (e.g., a day's worth of communications) or a finer grained slice (e.g., an hour's worth of communications). The larger the slice, the fewer false alarms would be expected to be generated as local anomalies in the data would be smoothed out—however, the shorter the slice, the faster the communication monitoring system can respond.

Analysis component 460 may load and execute instructions included in one or more error detection profiles stored in an error detection profile storage 462. For example, the error detection profile may specify communication record transformation instructions for generating intermediate data that is then used by instructions in the error detection profile for determining one or more error conditions from the intermediate data. For example, the analysis component may determine a count of the number of communications that have durations that are within one or more communication duration ranges and compare that count to a normal value specified in the error detection profile. If the count exceeds the normal value by a threshold specified in the error detection profile, the analysis component 460 may determine that an error is occurring and pass this indication to an action component 465.

As another example, the analysis component may execute an error detection profile for detecting DTMF errors. The error detection profile may instruct the analysis component 460 to determine, from the communication records, a percentage of communications that did not transition to a communication bridge. If this percentage exceeds a normal value specified in the error detection profile by a threshold specified in the error detection profile, then the analysis component 460 may indicate an error to the action component 465. As yet another example error detection profile, an error detection profile may instruct the analysis component to determine if any communication records indicated that the communication failed for an invalid number and whether a communication was previously, or subsequently, completed to that number within a threshold time frame. If the answer is yes, then the analysis component 460 may indicate an error to the action component 465.

Analysis component 460 may also determine a network segment that is attributable to the error. For example, communication records associated with the error may be identified and commonalities may be determined from those communications. For example, if a statistically significant (e.g., greater than four standard deviations from a norm) frequency of communications experiencing the particular error utilize a common network segment (such as a particular service address or number of the conference communications server 455, a particular communication origin network, a particular service provider network, or the like)—the error may be attributed to that particular network segment. In other examples, the analysis component 460 may determine that a particular network segment is responsible for the error by determining from a statistical model if a statistically significant probability exists for the occurrence of the error on the particular network segment. In some examples, the analysis component 460 may utilize only the communication records corresponding to the current time slice to identify commonalities, but in other examples, the analysis component 460 may utilize communication records identified as being associated with the error condition during a broader time frame. Thus, the analysis component 460 may detect and respond to immediate issues, but also utilize broader data to attribute the error to a particular network segment.

The error indication and also an identifier of one or more network segments deemed responsible may be sent to the action component 465. Action component 465 may re-route new communications to the conference communication server 455 so that they do not go through the responsible network segment(s). For example, the action component 465 may instruct the conference communication server to stop using the communication server 435 that is responsible for the network segment that is the cause of the error. This will force new communications to be routed to a different communication server. For example, if the network segment responsible is terminated by the communication server 435, the conference communication server 455 may stop using the communication server 435. This may re-route traffic of network 420 to communication server 440. Other example fixes may include requesting a change to a routing table in one or more of the communication servers to route traffic away from the network segment; upgrading a QoS level for one or more of the calls, and the like.

In some examples, active communications may be re-routed. For example, if the error condition is a communication duration timer, active communications that are approaching a duration corresponding to the duration timer may be re-routed. In some examples, this may be accomplished by sending a message to an application associated with the conference communication server 455 (e.g., a SKYPE FOR BUSINESS® application). The application may then switch a network that the data associated with the conference communication is traveling on. For example, if user computing device 405 is communicating across a circuit switched cellular network or using cellular provided VoIP services, when the duration of the communication approaches the cut-off time, the application may switch to using a packet-based network using Voice over Internet Protocol (VoIP) provided by the application associated with the conference communication server prior to the cutoff. This switch may be transparent to the user as the conference communication server 455 may coordinate with the application on the user's computing device to perform the handover. For example, while the user's computing device disconnects with the first network and re-establishes communication with the second network, the conference communication server 455 may continue to indicate to other users that the user is present. Thus, to other users, it appears that the user that is handing off never left the conference. Additionally, in some examples, a soft handover may be performed. That is, the user's computing device may connect to the conference communication over the second network (and be receiving and sending data over the second network) before disconnecting on the first network—ensuring a seamless transfer.

Figure 5:
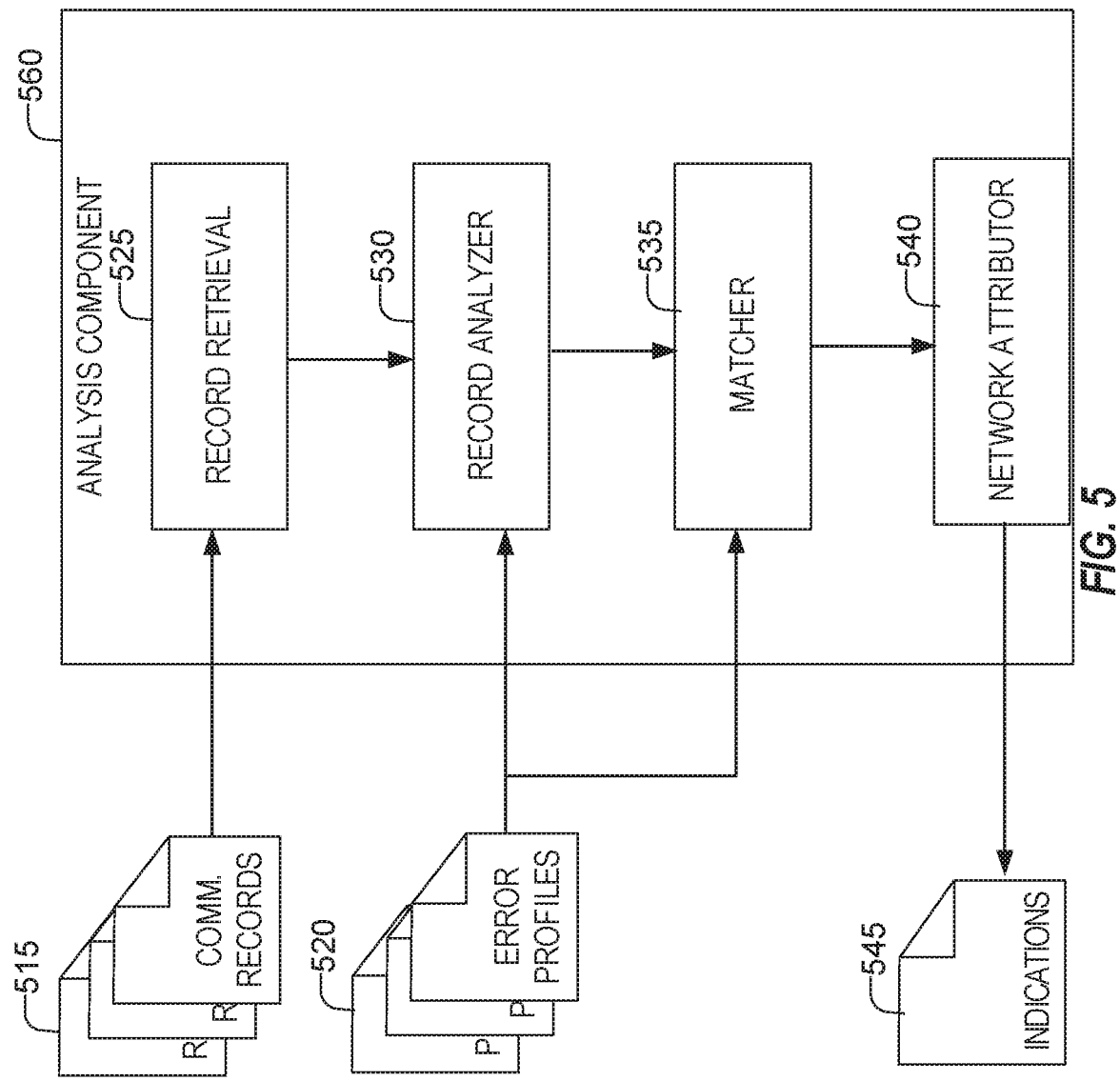
FIG. 5 illustrates a logical diagram of an example analysis component according to some examples of the present disclosure.

FIG. 5 illustrates a logical diagram of an example of an analysis component 560 according to some examples of the present disclosure. Analysis component 560 is one example implementation of analysis component 460 of FIG. 4. Analysis component 560 includes a record retrieval module 525 that periodically retrieves one or more communication records 515 corresponding to a particular time slice. For example, such records may include records from yesterday, records from the past 6 hours, or the like. These communication records are passed to the record analyzer 530. Record analyzer 530 applies one or more transformations to the records in accordance with instructions in one or more error detection profiles 520 to produce one or more intermediate data sets. These intermediate data sets are passed to matcher 535. Matcher uses the intermediate data sets, the original communication records 515, or both to determine—based upon instructions in the error detection profiles 520—whether an error condition is indicated. This indication is then passed to the network attributor 540.

The network attributor 540 uses communication records 515, intermediate data, error detection profiles, and/or the like to determine which network segment is responsible for one or more of the detected error conditions. The indication of the error conditions found and the network segments responsible are output as indications 545.

In some examples, the network attributor 540 may look at only the current indications and determine which network segment is responsible for the current error conditions by evaluating communication records associated with that error. In other examples, the network attributor 540 may look at past indications (and the associated communication records) that were generated as well as the current indications (and their associated communication records) to isolate a network segment that is attributed to the error conditions.

The network attributor 540 may determine a statistically significant correlation between a particular network segment and the error condition. For example, the network attributor 540 may determine that the error is occurring frequently (e.g., over a predetermined threshold or over a statistically significant amount of times) on communications terminating at a single service line of the conference communication server. In this scenario, the conference communication server may be misconfigured. In some examples, if the error condition is occurring with a statistical significant frequency on communications terminating at multiple service lines, then the system may look at whether the error condition is occurring frequently (e.g., over a predetermined threshold amount or over a statistically significant amount of times) from a particular origin. Thus, if all the communication sessions experiencing this error come from a particular address range or block (e.g., a particular telephone number prefix) or are otherwise identified as originating from a particular network segment, then that network segment is identified as a source of the error. An example of this situation is where a corporate PSTN is misconfigured and that misconfiguration causes the error. In this situation, a statistically significant number of communications experiencing this error would originate from this source. In some examples, if multiple communication sessions from multiple different origins terminating at multiple different service lines are experiencing a particular issue with a frequency that is statistically significant, and all the communication sessions travelled through a particular network service provider, then that service provider may be identified as the source of the error condition.

In some examples, the network attributor 540 may build one or more statistical models. For example, the statistical model may provide a probability distribution of the occurrence of the error given a particular network segment. If the probability is statistically significant (e.g., over four standard deviations from a normal probability) then the problem may be attributed to the network segment. This is illustrated in greater detail in FIG. 12.

Figure 6:
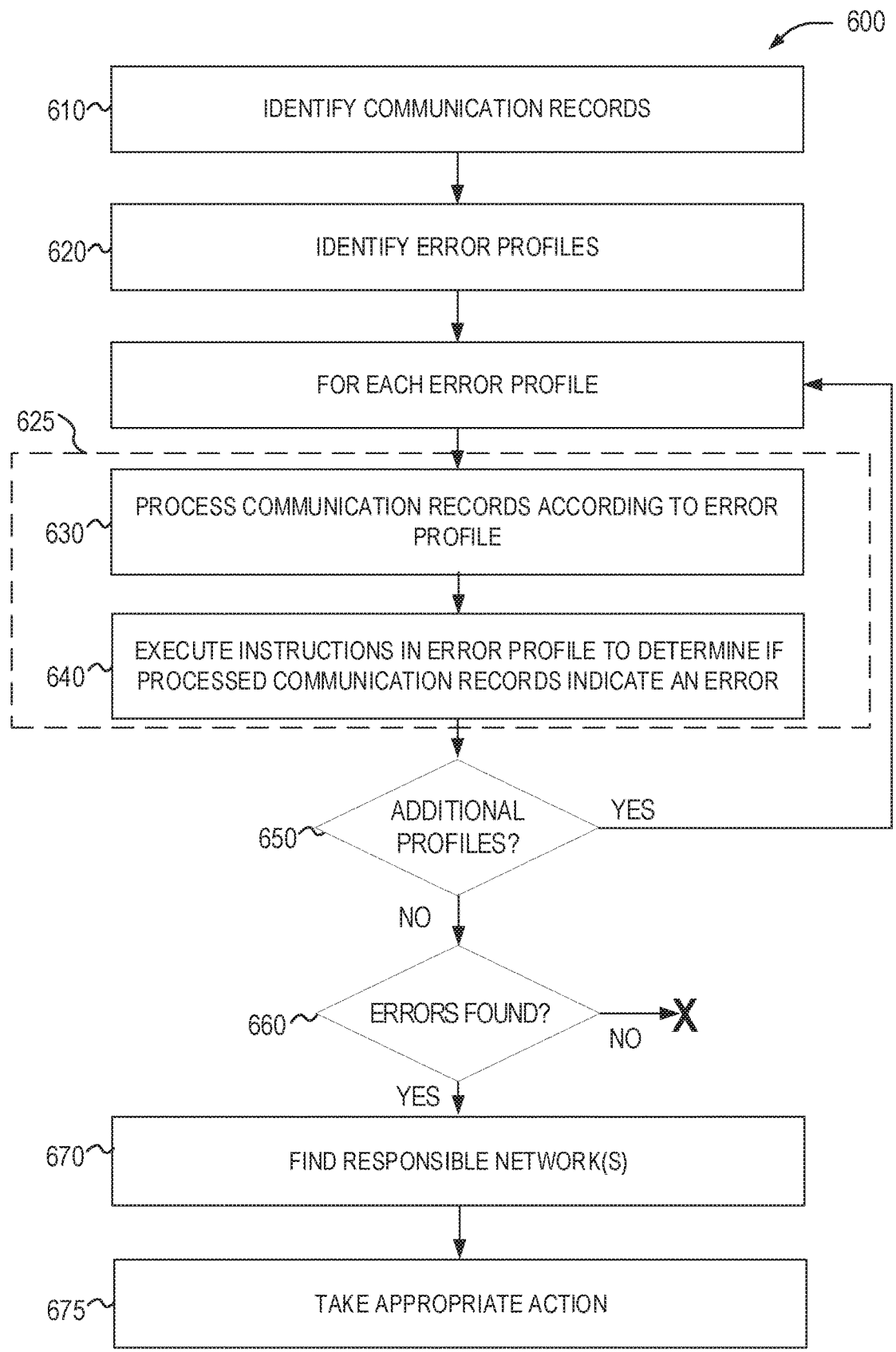
FIG. 6 illustrates a flowchart of a method performed by a communication monitoring system according to some examples of the present disclosure.

FIG. 6 illustrates a flowchart of a method 600 performed by a communication monitoring system according to some examples of the present disclosure. In some examples, method 600 may be run on a periodic basis to proactively scan the communication records to identify and fix problems with PSTN traffic. Operations 630 and 640, denoted by box 625 may be specific to the error detection profile and examples are provided in FIGS. 7-9.

At operation 610 the communication monitoring system may identify communication records corresponding to a particular time slice. For example, the past day, the past week, the past month, or the like. The records may be created by a communication conferencing server, a PSTN network, another communication network, or the like. At operation 620, a plurality of one or more error detection profiles are identified. The error detection profiles may be stored in a database (e.g., error detection profile storage 462), may be stored as part of an executable program run by the communication monitoring system, may be stored in random access memory (RAM), read only memory (ROM), may be hardwired (e.g., an Application Specific Integrated Circuit—ASIC), or the like.

Operations 630 and 640 are performed for each error detection profile. At operation 630, the communication records may be processed according to instructions in the error detection profile. For example, instructions may include summation of one or more values in the communication records, statistical analysis, counting the occurrence of one or more conditions, and the like to produce an intermediate result. At operation 640 the communication monitoring system may execute instructions in the error detection profile to determine if one or more of: the intermediate result, the communication records, thresholds from the error detection profile, normal values in the error detection profile, or the like indicate an error. For example, if the intermediate result shows a statistically significant deviation (e.g., greater than four standard deviations) from normal values, then an error may be indicated.

At operation 650, a determination is made whether there are additional error detection profiles to evaluate. If there are, then operation proceeds to operation 630. If there are no more error detection profiles to evaluate, then at operation 660, a determination is made if there were any errors found. If not, then processing terminates. If there are errors found, then at operation 670, the networks or network segments responsible for the errors may be determined as previously described. Once the responsible network segments are determined the communication monitoring system may take the appropriate action at operation 675. For example, the communication monitoring system may determine which network segments are causing the error and re-route traffic around these segments.

Figure 7:
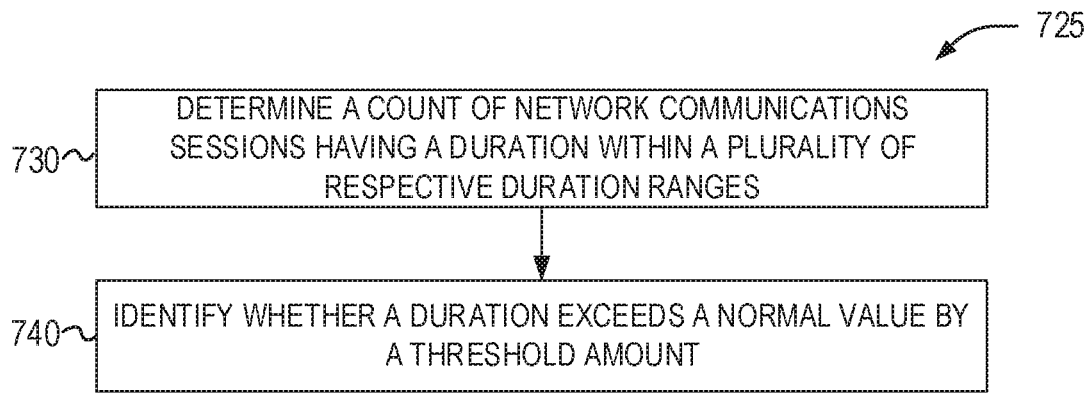
FIGS. 7-9 illustrate flowcharts of methods of performing respective operations for different error detection profiles according to some examples of the present disclosure.
Figure 8:
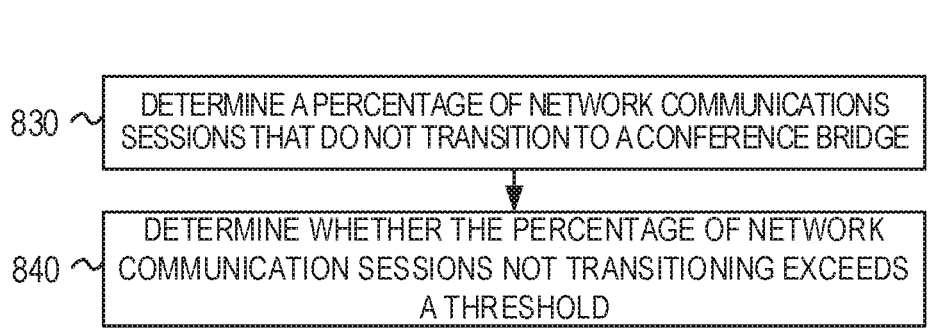
Figure 9:
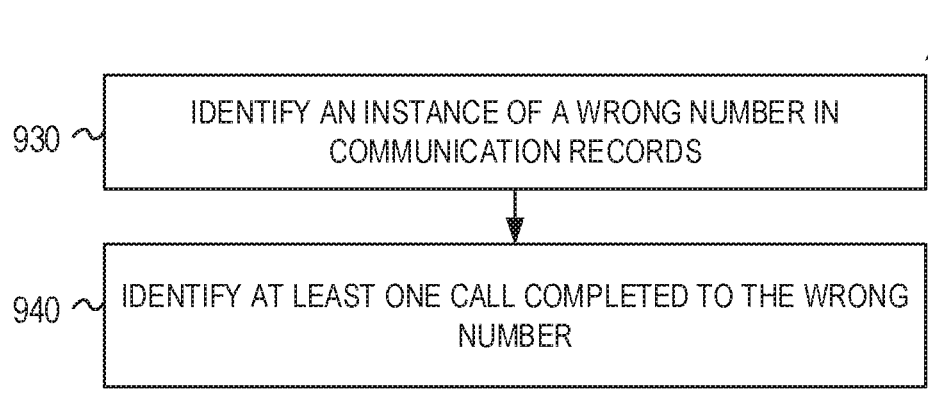

FIGS. 7-9 illustrate flowcharts of methods 725, 825, and 925 of performing the operations in box 625 of FIG. 6 for different error detection profiles according to some examples of the present disclosure. It will be appreciated that all three methods may be utilized in a system to detect all three types of errors. In FIG. 7, at operation 730 the communication monitoring system may determine a count of network communication sessions having a duration within one or more respective duration ranges. For example, this determination may include: a count of the number of communications lasting between a first minimum duration and a first maximum duration; a count of the number of communications between a second minimum duration (which may be the first maximum duration); and a second maximum duration, and the like. At operation 740, the counts for each duration range may be evaluated and compared to a normal communication volume for communications at that duration. If the counts for a particular duration range differ from the normal communication volume by more than a predetermined threshold, percentage, or the like, the system may identify that a duration corresponds to the error condition in the error detection profile.

In FIG. 8, at operation 830, the communication monitoring system may determine a percentage of network communications sessions that do not transition to a conference bridge. At operation 840, the communication monitoring system may determine whether the percentage of network communication sessions not transitioning exceeds an expected value by a particular threshold (included in the error detection profile). If the percentage of network communication sessions exceeds the threshold, the system may identify that a network is not passing DTMF tones.

In FIG. 9, at operation 930 the communication monitoring system may determine one or more instances of a wrong number error in the communication records. At operation 940, the communication monitoring system may determine at least one communication completed to that wrong number within a predetermined period of time from the wrong number error. If at least one communication was completed within the predetermined period of time, the system may identify that a wrong-number error is occurring.

Figure 10:
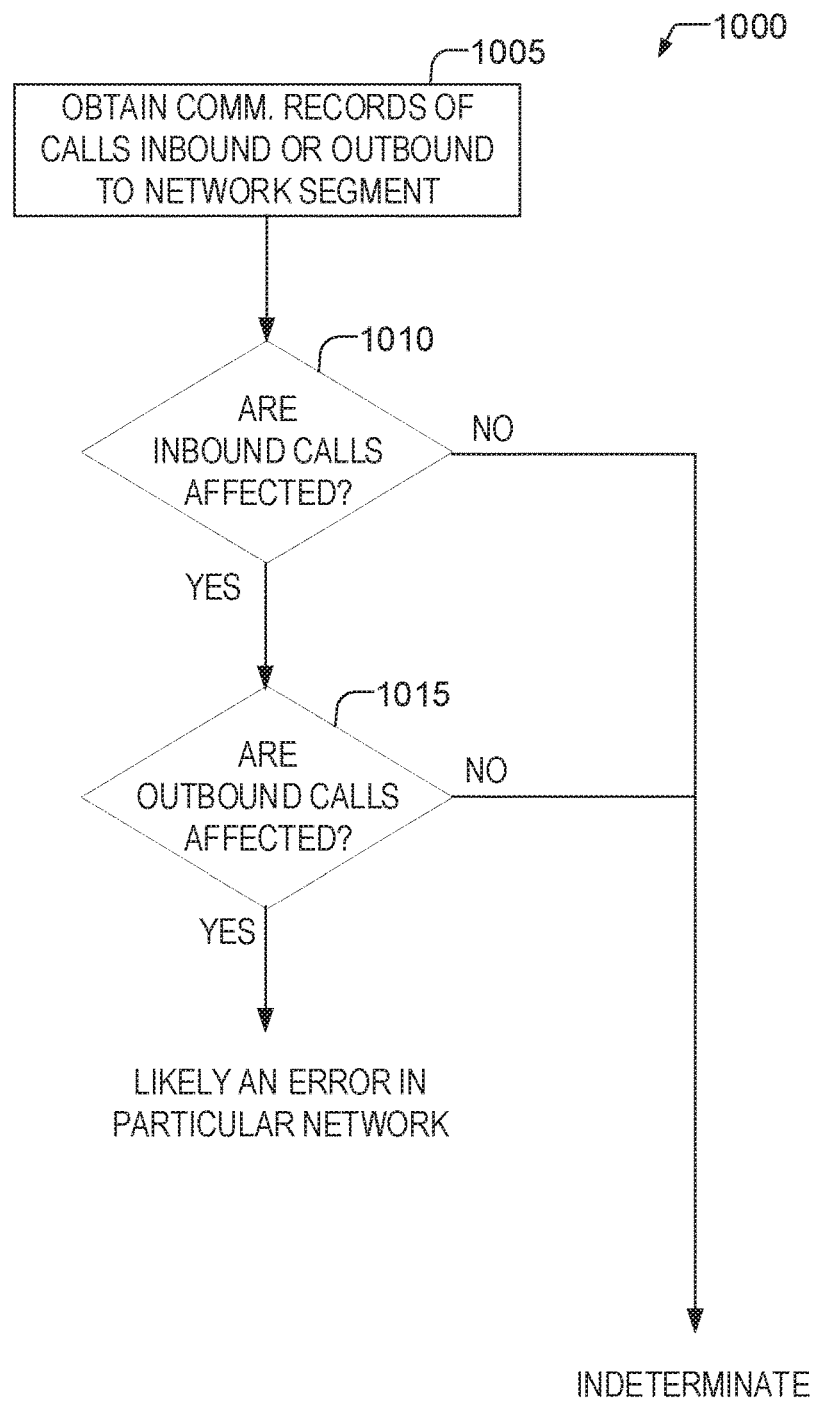
FIG. 10 illustrates a flowchart of a method of determining whether a particular network segment is affected by quality issues according to some examples of the present disclosure.

FIG. 10 illustrates a flow chart of a method 1000 of determining whether a particular network segment is affected by quality issues according to some examples of the present disclosure. For example, whether a customer's internal PSTN network is suffering from lack of quality issues or whether the problem is elsewhere. At operation 1005, communication records for inbound and outbound communications originating from, or terminating at a particular network segment that the communication monitoring system is analyzing are obtained. At operation 1010, communication records inbound to the network segment are analyzed for indicators of low quality. Indicators of low quality may include multiple unsuccessful attempts to join the same conference bridge, multiple reconnects of short duration to a specific conference bridge, and a shorter than normal call duration from originating/terminating number measured at the p25 and p50. If inbound communications are not affected, then the error may be in the network segment or may be in a different network segment. If inbound communications are affected, then a determination is made (from the communication records), whether outbound communications are affected at operation 1015. If outbound communications are not affected, then the error may be in the network segment or may be in a different network segment. If outbound communications and inbound communications are affected, then the error is likely in the examined network segment.

Figure 12:
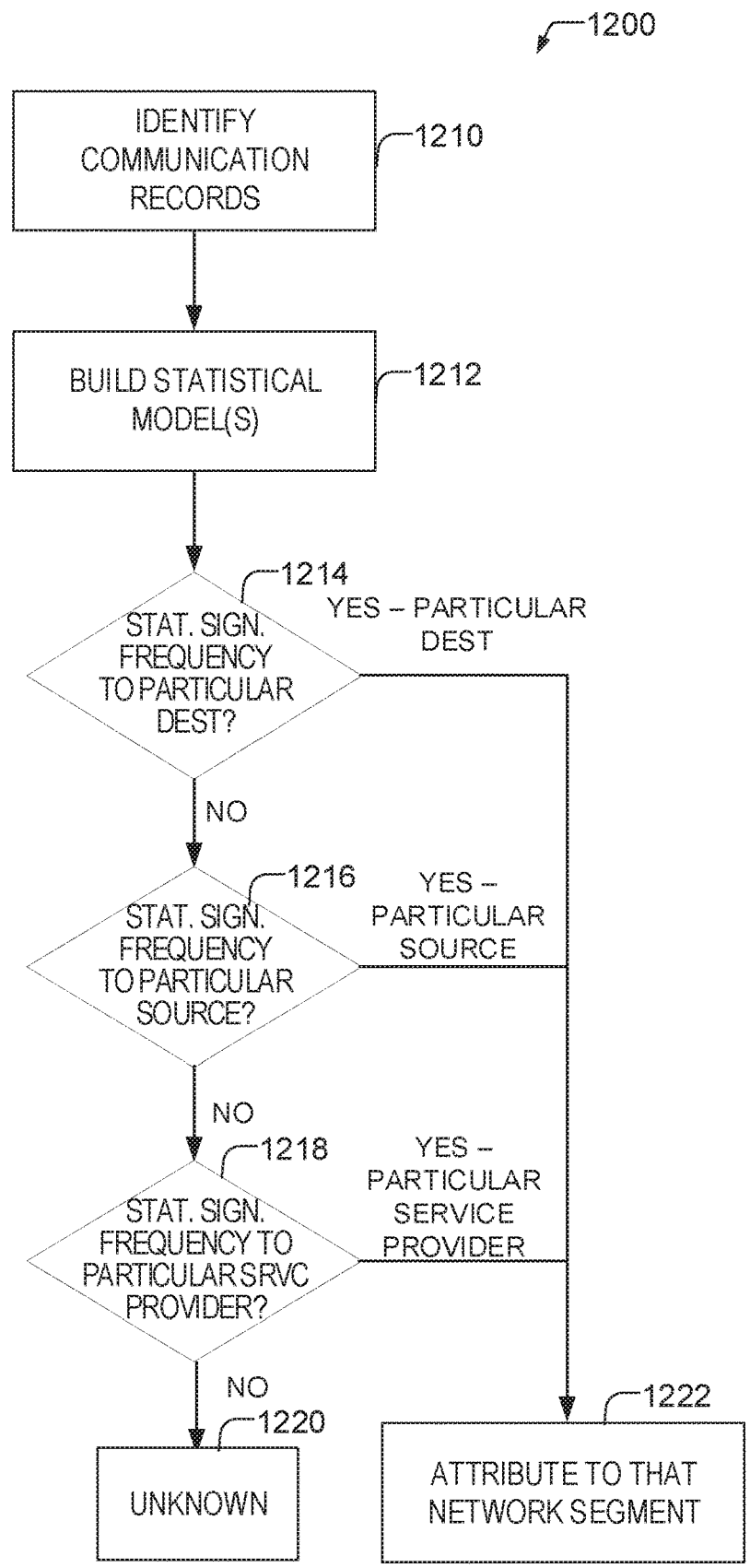
FIG. 12 illustrates a flow chart of a method of determining a network segment responsible for an error condition according to some examples of the present disclosure

FIG. 12 illustrates a flow chart of a method 1200 of determining a network segment responsible for an error condition according to some examples of the present disclosure. FIG. 12 may be performed by the network attributor 540 of FIG. 5 in some examples. At operation 1210 the communications records used to attribute the error to a particular network segment are identified. These records may include records in the time slice and/or records from a broader time period. At operation 1212 the network attributor may build one or more statistical models from the communications records. The statistical model may provide a probability distribution of the occurrence of a given error given a particular network segment.

Based upon the statistical model, at operation 1214 a determination may be made as to whether a particular destination (e.g., a common service number) shows a statistically significant probability of experiencing an error. If so, then at operation 1222 the error is attributed to the particular destination identified at operation 1214. If not, then at operation 1216, a determination may be as to whether a particular source network segment shows a statistically significant probability of experiencing an error. If so, then at operation 1222 the error is attributed to the particular source identified at operation 1216. If not, then at operation 1218, a determination may be as to whether a particular service provider segment shows a statistically significant probability of experiencing an error. If so, then at operation 1222 the error is attributed to the particular service provider identified at operation 1218. If no statistically significant probability is identified than at operation 1220, the source may be unknown.

Figure 11:
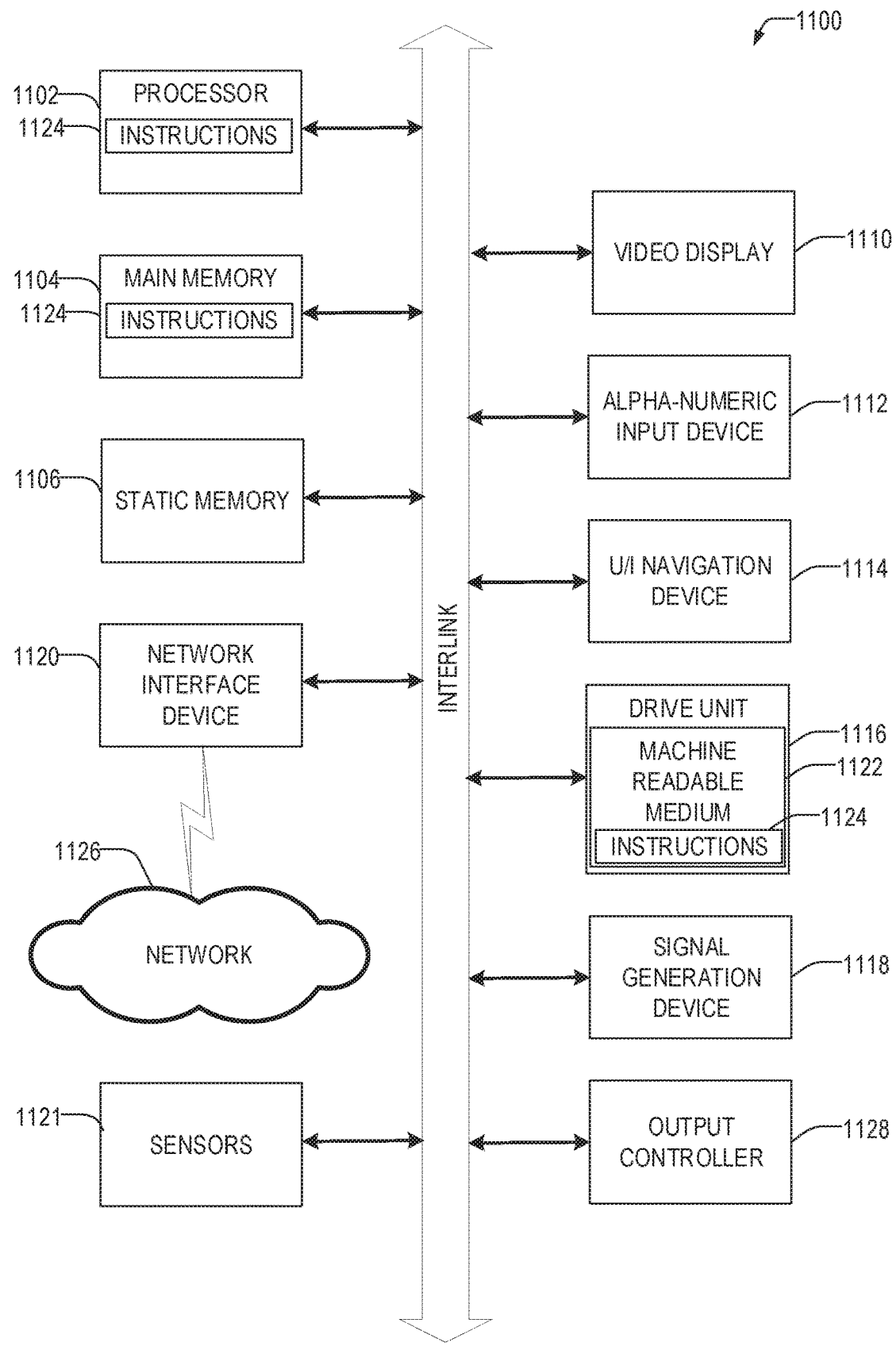
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a, personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. Machine 1100 may be an example of, or be used to implement a communication monitoring system, a conference communication server, a communication server, a user computing device, or the like. Machine 1100 may execute the methods of FIGS. 6-10. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal (e.g., a non-transitory storage medium).

The instructions 1124 may further be transmitted or received over a communications network 1126 using a transmission medium via the network interface device 1120. The Machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, ), IEEE 802.15.4 family of standards, a fifth generation family of standards (promulgated by the 3$^{rd}$ Generation Partnership Project (3GPP)), a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

Other Notes and Examples

Example 1 is a computing device for communication network troubleshooting, the computing device comprising: a processor; a memory, comprising instructions, which when executed by the processor, causes the processor to perform operations comprising: identifying a plurality of communication records corresponding to a plurality of network communications sessions occurring within a first time window; determining, using the plurality of communication records, a count of a number of network communications sessions having a duration within a particular duration range; determining that the count of the number of network communications sessions within the duration range exceeds an expected number of communications by a threshold amount; responsive to the count exceeding the expected number of communications by the threshold amount, identifying a first network path that carried at least one network communication session having the particular communication duration based upon the communication records; and causing a network configuration change to route a future network communications session over a second network path.

In Example 2, the subject matter of Example 1 includes, wherein the operations of causing the network configuration change to route the future network communications session over the second network path comprises configuring a communications server to utilize a second provider gateway instead of a first provider gateway.

In Example 3, the subject matter of Examples 1-2 includes, wherein the network communications sessions are conference calls or video conference calls.

In Example 4, the subject matter of Example 3 includes, wherein the network communications sessions communicate voice data and video data.

In Example 5, the subject matter of Examples 1-4 includes, wherein the operations further comprise: displaying an indication of the first network path and an indication that the first network path carried the at least one network communication session having the particular communication duration.

In Example 6, the subject matter of Examples 1-5 includes, wherein the operations further comprise: notifying a network administrator of the first network path.

In Example 7, the subject matter of Examples 1-6 includes, wherein the operations further comprise: reconfiguring an active network communication session that is using the first network path to using the second network path prior to the active network communication session reaching the particular communication duration.

In Example 8, the subject matter of Example 7 includes, wherein the operations of reconfiguring the active network communication session comprises instructing an application on a computing device providing the active network communication session to a user to switch to an Internet Protocol (IP) based network connection utilizing the second network path.

Example 9 is a machine-readable medium, storing instructions, which when executed by a machine, cause the machine to perform operations comprising: identifying a plurality of communication records corresponding to a plurality of network communications sessions occurring within a first time window; determining, using the plurality of communication records, a count of a number of network communications sessions having a duration within a particular duration range; determining that the count of the number of network communications sessions within the duration range exceeds an expected number of communications by a threshold amount; responsive to the count exceeding the expected number of communications by the threshold amount, identifying a first network path that carried at least one network communication session having the particular communication duration based upon the communication records; and causing a network configuration change to route a future network communications session over a second network path.

In Example 10, the subject matter of Example 9 includes, wherein the operations of causing the network configuration change to route the future network communications session over the second network path comprises configuring a communications server to utilize a second provider gateway instead of a first provider gateway.

In Example 11, the subject matter of Examples 9-10 includes, wherein the network communications sessions are conference calls or video conference calls.

In Example 12, the subject matter of Example 11 includes, wherein the network communications sessions communicate voice data and video data.

In Example 13, the subject matter of Examples 9-12 includes, wherein the operations further comprise: displaying an indication of the first network path and an indication that the first network path carried the at least one network communication session having the particular communication duration.

In Example 14, the subject matter of Examples 9-13 includes, wherein the operations further comprise: notifying a network administrator of the first network path.

In Example 15, the subject matter of Examples 9-14 includes, wherein the operations further comprise: reconfiguring an active network communication session that is using the first network path to using the second network path prior to the active network communication session reaching the particular communication duration.

In Example 16, the subject matter of Example 15 includes, wherein the operations of reconfiguring the active network communication session comprises instructing an application on a computing device providing the active network communication session to a user to switch to an Internet Protocol (IP) based network connection utilizing the second network path.

Example 17 is a method for communication network troubleshooting, the method comprising: identifying a plurality of communication records corresponding to a plurality of network communications sessions occurring within a first time window; determining, using the plurality of communication records, a count of a number of network communications sessions having a duration within a particular duration range; determining that the count of the number of network communications sessions within the duration range exceeds an expected number of communications by a threshold amount, responsive to the count exceeding the expected number of communications by the threshold amount, identifying a first network path that carried at least one network communication session having the particular communication duration based upon the communication records; and causing a network configuration change to route a future network communications session over a second network path.

In Example 18, the subject matter of Example 17 includes, wherein causing the network configuration change to route the future network communications session over the second network path comprises configuring a communications server to utilize a second provider gateway instead of a first provider gateway.

In Example 19, the subject matter of Examples 17-18 includes, wherein the network communications sessions are conference calls or video conference calls.

In Example 20, the subject matter of Example 19 includes, wherein the network communications sessions communicate voice data and video data.

In Example 21, the subject matter of Examples 17-20 includes, displaying an indication of the first network path and an indication that the first network path carried the at least one network communication session having the particular communication duration.

In Example 22, the subject matter of Examples 17-21 includes, notifying a network administrator of the first network path.

In Example 23, the subject matter of Examples 17-22 includes, reconfiguring an active network communication session that is using the first network path to using the second network path prior to the active network communication session reaching the particular communication duration.

In Example 24, the subject matter of Example 23 includes, wherein reconfiguring the active network communication session comprises instructing an application on a computing device providing the active network communication session to a user to switch to an Internet Protocol (IP) based network connection utilizing the second network path.

Example 25 is a device for communication network troubleshooting, the device comprising: means for identifying a plurality of communication records corresponding to a plurality of network communications sessions occurring within a first time window; means for determining, using the plurality of communication records, a count of a number of network communications sessions having a duration within a particular duration range; means for determining that the count of the number of network communications sessions within the duration range exceeds an expected number of communications by a threshold amount; means for responsive to the count exceeding the expected number of communications by the threshold amount, identifying a first network path that carried at least one network communication session having the particular communication duration based upon the communication records; and means for causing a network configuration change to route a future network communications session over a second network path.

In Example 26, the subject matter of Example 25 includes, wherein the means for causing the network configuration change to route the future network communications session over the second network path comprises means for configuring a communications server to utilize a second provider gateway instead of a first provider gateway.

In Example 27, the subject matter of Examples 25-26 includes, wherein the network communications sessions are conference calls or video conference calls.

In Example 28, the subject matter of Example 27 includes, wherein the network communications sessions communicate voice data and video data.

In Example 29, the subject matter of Examples 25-28 includes, means for displaying an indication of the first network path and an indication that the first network path carried the at least one network communication session having the particular communication duration.

In Example 30, the subject matter of Examples 25-29 includes, means for notifying a network administrator of the first network path.

In Example 31, the subject matter of Examples 25-30 includes, means for reconfiguring an active network communication session that is using the first network path to using the second network path prior to the active network communication session reaching the particular communication duration.

In Example 32, the subject matter of Example 31 includes, wherein the means for reconfiguring the active network communication session comprises means for instructing an application on a computing device providing the active network communication session to a user to switch to an Internet Protocol (IP) based network connection utilizing the second network path.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

What is claimed is:
1. A computing device for communication network troubleshooting, the computing device comprising:
  a processor;

a memory, comprising instructions, which when executed by the processor, causes the processor to perform operations comprising:
  identifying a plurality of communication records corresponding to a plurality of network communications sessions occurring within a first time window;
  determining, using the plurality of communication records, a count of a number of network communications sessions having a duration within a particular duration range;
  determining that the count of the number of network communications sessions within the duration range exceeds an expected number of communications by a threshold amount;
  responsive to the count exceeding the expected number of communications by the threshold amount, identifying a first network path that carried at least one network communication session having the particular communication duration based upon the communication records; and
  causing a network configuration change to route a future network communications session over a second network path.

2. The computing device of claim 1, wherein the operations of causing the network configuration change to route the future network communications session over the second network path comprises configuring a communications server to utilize a second provider gateway instead of a first provider gateway.

3. The computing device of claim 1, wherein the network communications sessions are conference calls or video conference calls.

4. The computing device of claim 3, wherein the network communications sessions communicate voice data and video data.

5. The computing device of claim 1, wherein the operations further comprise:
  displaying an indication of the first network path and an indication that the first network path carried the at least one network communication session having the particular communication duration.

6. The computing device of claim 1, wherein the operations further comprise:
  notifying a network administrator of the first network path.

7. The computing device of claim 1, wherein the operations further comprise:
  reconfiguring an active network communication session that is using the first network path to using the second network path prior to the active network communication session reaching the particular communication duration.

8. The computing device of claim 7, wherein the operations of reconfiguring the active network communication session comprises instructing an application on a computing device providing the active network communication session to a user to switch to an Internet Protocol (IP) based network connection utilizing the second network path.

9. A method for communication network troubleshooting, the method comprising:
  identifying a plurality of communication records corresponding to a plurality of network communications sessions occurring within a first time window;
  determining, using the plurality of communication records, a count of a number of network communications sessions having a duration within a particular duration range;
  determining that the count of the number of network communications sessions within the duration range exceeds an expected number of communications by a threshold amount;
  responsive to the count exceeding the expected number of communications by the threshold amount, identifying a first network path that carried at least one network communication session having the particular communication duration based upon the communication records; and
  causing a network configuration change to route a future network communications session over a second network path.

10. The method of claim 9, wherein causing the network configuration change to route the future network communications session over the second network path comprises configuring a communications server to utilize a second provider gateway instead of a first provider gateway.

11. The method of claim 9, wherein the network communications sessions are conference calls or video conference calls.

12. The method of claim 11, wherein the network communications sessions communicate voice data and video data.

13. The method of claim 9, further comprising:
  displaying an indication of the first network path and an indication that the first network path carried the at least one network communication session having the particular communication duration.

14. The method of claim 9, further comprising:
  notifying a network administrator of the first network path.

15. The method of claim 9, further comprising:
  reconfiguring an active network communication session that is using the first network path to using the second network path prior to the active network communication session reaching the particular communication duration.

16. The method of claim 15, wherein reconfiguring the active network communication session comprises instructing an application on a computing device providing the active network communication session to a user to switch to an Internet Protocol (IP) based network connection utilizing the second network path.

17. A device for communication network troubleshooting, the device comprising:
  means for identifying a plurality of communication records corresponding to a plurality of network communications sessions occurring within a first time window;
  means for determining, using the plurality of communication records, a count of a number of network communications sessions having a duration within a particular duration range;
  means for determining that the count of the number of network communications sessions within the duration range exceeds an expected number of communications by a threshold amount;
  means for responsive to the count exceeding the expected number of communications by the threshold amount, identifying a first network path that carried at least one network communication session having the particular communication duration based upon the communication records; and
  means for causing a network configuration change to route a future network communications session over a second network path.

18. The device of claim 17, wherein the means for causing the network configuration change to route the future network communications session over the second network path comprises means for configuring a communications server to utilize a second provider gateway instead of a first provider gateway.

19. The device of claim 17, wherein the network communications sessions are conference calls or video conference calls.

20. The device of claim 19, wherein the network communications sessions communicate voice data and video data.

* * * * *